(12) United States Patent
Bader

(10) Patent No.: US 9,958,052 B2
(45) Date of Patent: May 1, 2018

(54) SYSTEM HAVING A GEAR UNIT

(75) Inventor: Antonius Bader, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 970 days.

(21) Appl. No.: 12/921,322

(22) PCT Filed: Feb. 25, 2009

(86) PCT No.: PCT/EP2009/001347
§ 371 (c)(1),
(2), (4) Date: Sep. 7, 2010

(87) PCT Pub. No.: WO2009/109320
PCT Pub. Date: Sep. 11, 2009

(65) Prior Publication Data
US 2011/0017013 A1   Jan. 27, 2011

(30) Foreign Application Priority Data
Mar. 6, 2008   (DE) ........................ 10 2008 013 059

(51) Int. Cl.
*F16H 57/02*   (2012.01)
*F16H 57/04*   (2010.01)
*F16H 57/01*   (2012.01)
*F16H 57/031*   (2012.01)
*F16H 59/16*   (2006.01)

(52) U.S. Cl.
CPC ......... *F16H 57/0405* (2013.01); *F16H 57/01* (2013.01); *F16H 57/031* (2013.01); *F16H 57/0449* (2013.01); *F16H 59/16* (2013.01); *F16H 2057/02069* (2013.01); *Y10T 74/2186* (2015.01)

(58) Field of Classification Search
CPC .... G01M 13/00; G01M 13/02; G01M 13/021; G01M 13/028; F16H 57/02; F16H 57/01; F16H 57/031
USPC ................... 74/606 R; 73/587, 162
See application file for complete search history.

(56) References Cited

U.S. PATENT DOCUMENTS 5,487,318 A * 1/1996 Schott ................ F16H 59/70
74/473.37
6,434,512 B1 * 8/2002 Discenzo ............ F16C 19/52
702/184

(Continued)

FOREIGN PATENT DOCUMENTS

DE          101 17 405        1/2002
DE      10 2005 053 772       5/2007

(Continued)

OTHER PUBLICATIONS

International Search Report and Written Opinion dated May 4, 2009, issued in corresponding International Application No. PCT/EP2009/001347.

(Continued)

*Primary Examiner* — Paul West
*Assistant Examiner* — Xin Zhong
(74) *Attorney, Agent, or Firm* — Andrews Kurth Kenyon LLP

(57) ABSTRACT

A system includes a gear unit, the gear unit including at least one housing cover, a sensor unit, on which sensors are provided, being provided on the housing cover, the sensors being connected at least electrically to an evaluation unit.

16 Claims, 1 Drawing Sheet

(56) References Cited

U.S. PATENT DOCUMENTS

| | | | |
|---|---|---|---|
| 6,530,856 B1 | 3/2003 | Kakiage | |
| 6,541,961 B1* | 4/2003 | Max | G01D 5/2013 324/207.12 |
| 7,231,303 B2* | 6/2007 | Griessler et al. | 702/34 |
| 7,262,528 B2 | 8/2007 | Amagasa | |
| 2002/0062298 A1* | 5/2002 | Meier-Arendt | 707/1 |
| 2002/0121401 A1 | 9/2002 | Shimizu et al. | |
| 2005/0217418 A1* | 10/2005 | Dismon | F16H 57/02 74/606 R |
| 2005/0284225 A1* | 12/2005 | Luo | F16H 57/01 73/593 |
| 2007/0074697 A1* | 4/2007 | Nielsen | F01M 1/14 123/196 R |
| 2008/0289436 A1* | 11/2008 | Laakkonen | G01L 5/12 73/862.49 |

FOREIGN PATENT DOCUMENTS

| | | |
|---|---|---|
| EP | 0 252 481 | 1/1988 |
| EP | 1 203 903 | 5/2002 |
| EP | 1 582 776 | 10/2005 |
| JP | 1 217 261 | 6/2002 |
| JP | 2004-60823 | 2/2004 |
| JP | 2005-304252 | 10/2005 |
| WO | 02/39799 | 5/2002 |

OTHER PUBLICATIONS

International Preliminary Report on Patentability dated Sep. 16, 2010, issued in corresponding International Application No. PCT/EP2009/001347.

European Office Action, dated Jun. 12, 2012, issued in corresponding European Patent Application No. 09716479.2.

\* cited by examiner

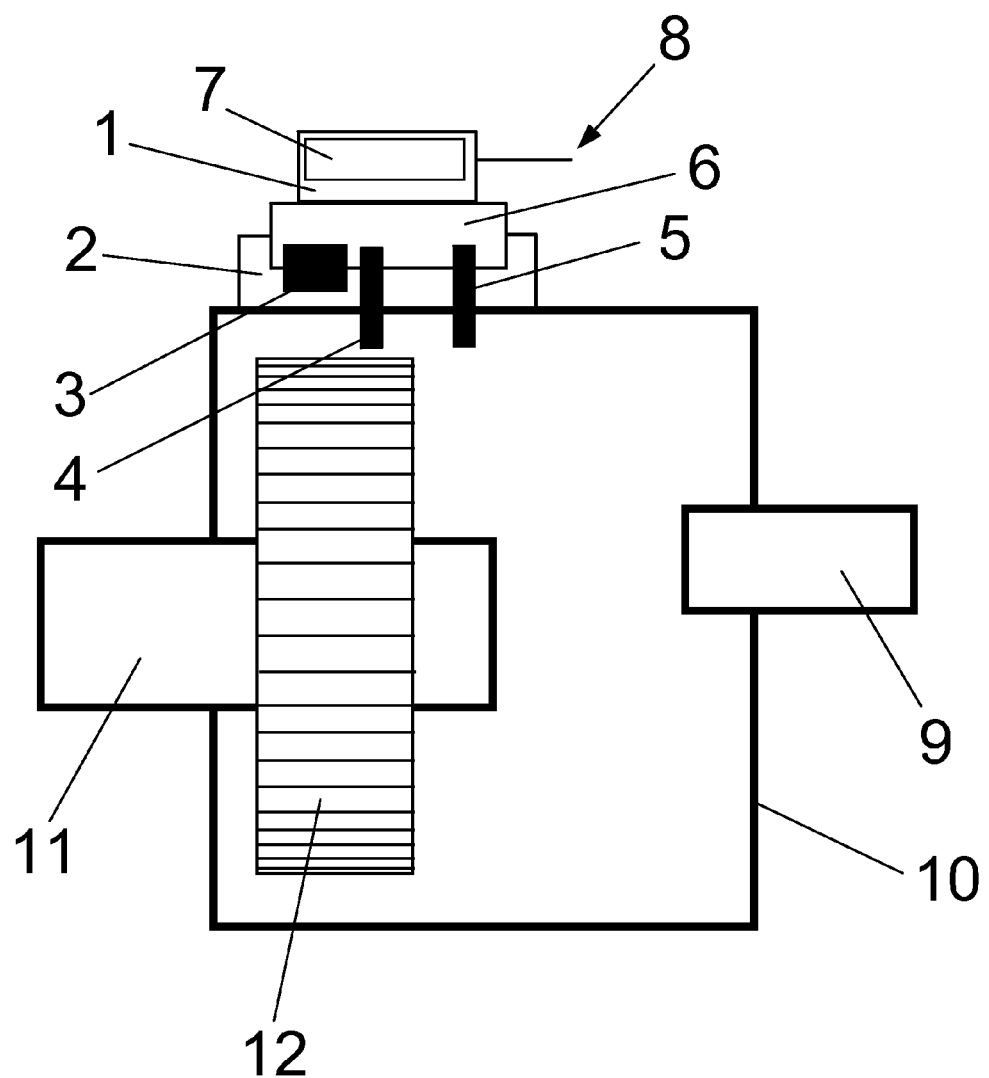

SYSTEM HAVING A GEAR UNIT

FIELD OF THE INVENTION

The present invention relates to a system having a gear unit.

BACKGROUND INFORMATION

It is well-known that, in order to mount an end wheel, gear units include a cutout on a housing part, which is able to be covered by a housing cover.

SUMMARY

Example embodiments of the present invention provide improved reliability in installations.

Example embodiments of the present invention provide a system having a gear unit, in which the gear unit includes at least one housing cover, a sensor unit, on which sensors are provided, being provided on the housing cover, the sensors being connected at least electrically to an evaluation unit.

An advantage in this context is that the housing cover is able to be provided with great functionality quickly and easily with the aid of the sensor unit. Thus, a gear unit incorporated in an installation is usable in various options if the simple housing cover, which has merely a closure function, is exchanged for a housing cover according to example embodiments of the present invention that is joined to the sensor unit. In this manner, a great variance in gear units is able to be produced, accompanied at the same time by the smallest possible number of parts. Values of physical quantities of the gear unit are detectable by the sensor unit, and therefore these values are able to be monitored. In this manner, reliability in the installation including the gear unit may therefore be increased.

In example embodiments, the housing cover covers a cutout in the housing or at least in one housing part of the gear unit. An advantage in this instance is that on one hand, values of variables are ascertainable, and on the other hand, the closure function is able to be ensured, as well. Thus, the housing cover has additional functions.

In example embodiments, the sensor unit includes accommodations for sensors. This has the advantage that the sensors are able to be accommodated in the sensor unit, and then are connectable quickly and easily as a unit to the housing cover and/or to the evaluation unit.

In example embodiments, the sensor unit is joined to the housing cover on the side of the housing cover facing the surroundings, or the sensor unit is formed in one piece with the housing cover. An advantage in the case of the one-piece construction is that fewer interfaces, and therefore lower manufacturing expenditure and fewer sealing problems occur. The sensor unit is accessible particularly easily at the outer side.

In example embodiments, the housing cover is made of metal and/or the sensor unit is made of a different metal or of plastic. An advantage in the case of the metallic implementation is that shielding against electromagnetic irradiation and great mechanical stability may be provided. The implementation in plastic simplifies production and reduces the costs and the mass of the gear unit.

In example embodiments, the evaluation unit is connected to the sensor unit, particularly on the side of the sensor unit facing the surroundings, and/or the evaluation unit is formed in one piece with the sensor unit. This offers the advantage that a robust type of construction is attainable, and assembly is achievable quickly and easily.

In example embodiments, a first sensor is a vibration sensor, particularly for detecting structure-borne noise generated by bearings and/or toothing parts. An advantage in this instance is that bearings and toothing parts may be monitored for wear.

In example embodiments, a further sensor is an inductive proximity sensor, particularly for determining the rotation of a toothing part. This has the advantage that the sensor is directed at the toothing. Therefore, a part of the toothing is in the responsive range of the sensor, the movement of the toothing thereby producing changes in the sensor signal, from which the rotational speed is then determinable.

In example embodiments, a further sensor is an oil-condition sensor, implemented particularly as an infrared sensor, especially for determining the condition, particularly the age, of the lubricating oil of the gear unit. An advantage in this case is that the oil condition is ascertainable in contactless fashion.

In example embodiments, a further sensor is a torque sensor, implemented particularly as an OFW or DMS sensor, especially for determining the torque transmitted with the aid of a shaft of the gear unit. This offers the advantage that the torque is determinable directly, and not just indirectly via the converter-fed, driving electric motor.

In example embodiments, a further sensor takes the form of an oil-level sensor. This is advantageous in that the oil level is additionally determinable, especially as a function of the operating state. A leakage is therefore detectable.

In example embodiments, a further sensor is provided which determines a displacement of a component of the gear unit. An advantage in this instance is that bearing damage or the like is easily identifiable, particularly if the correlation of the sensor signal with the signal of a rotational-speed sensor is formed and monitored.

In example embodiments, the evaluation unit includes a timing element, especially a quartz-crystal oscillator. An advantage here is that values of the rotational speed are determinable from the pulses of the toothing part detected from the moving toothing.

In example embodiments, the evaluation unit is formed in one piece with the sensor unit. An advantage in this case is that a compact, robust unit is able to be produced, which is connectable quickly and easily to the housing cover.

In example embodiments, the evaluation unit includes a display and/or interfaces and/or is formed as a node of a bus system. This is advantageous in that it is possible to provide for the transmission of the detected information to a central computer.

In example embodiments, the housing cover includes a cutout for a sensor. An advantage in this instance is that the sensor may be provided in protected fashion.

Further features and aspects of example embodiments of the present invention are described in more detail below with reference to the appended Figure.

LIST OF REFERENCE CHARACTERS

1 Evaluation unit
2 Cover
3 Vibration sensor
4 Inductive proximity sensor
5 Temperature sensor
6 Sensor unit
7 Display means
8 Interface, Outputs 9 Input shaft of the gear unit
10 Gear housing
11 Output shaft
12 Toothing part, particularly gear wheel

BRIEF DESCRIPTION OF THE DRAWING

FIG. 1 is a schematic view of a gear unit according to an example embodiment of the present invention.

DETAILED DESCRIPTION

A gear unit according to an example embodiment of the present invention is schematically illustrated in FIG. 1, only the end wheel being shown as toothing part 12, and intermediate shafts also not being shown.

Gear wheel 12 is joined with form locking to output shaft 11, particularly in torsionally-fixed manner, using a feather key connection. Output shaft 11 and input shaft 9 are supported by bearings in gear housing 10.

Gear housing 10 has a cutout through which toothing part 12 is insertable, and therefore able to be mounted. This cutout is closable by joining cover 2 to the gear housing. Preferably releasable connections such as screw connections are provided for this purpose. Also provided on the cover is a seal which permits a connection in a high protection class, and prevents the escape of lubricant from the gear unit.

Instead of a simple cover performing only a closure function, FIG. 1 shows a special cover 2, on which from the outer side, a sensor unit 6 is connectable, to which an evaluation unit 1 is linked, having a display 7 and an interface 8 such as a field-bus interface, and outputs.

Evaluation unit 1 is connected to the sensors and evaluates the signals of the sensors. Shown by way of example as sensor is a vibration sensor 3 which may take the form of an acceleration sensor and detects vibrations such as structure-borne noise, for example. In this manner, it is possible to monitor the condition of the bearings and the toothing of the toothing parts of the gear unit. For the connection to the vibration sensor, cover 2 has a machined surface onto which the sensor is able to be contacted, particularly with a high pressure force in order to achieve negligible signal loss.

Shown as a further sensor is an inductive proximity sensor 4, which is directed at the toothing of gear wheel 12. In this manner, it is made possible for the evaluation unit to determine the rotational speed of the toothing part. Cover 2 has a cutout for the inlet of inductive proximity sensor 4, in which it is imperviously connected. Over and above the rotational speed, it is also possible to determine the angular distance covered altogether, the number of total rotations, etc. A process control is executable using the values determined by the evaluation unit, the electric motor driving the gear unit being usable as the final controlling element.

In addition, a temperature sensor 5 is provided, which is provided in a cutout of cover 2, and detects the temperature of a component such as the toothing of a toothing part or the lubricant of the gear unit. Temperature sensor 5 preferably takes the form of an infrared sensor and is therefore able to detect the temperature of the lubricant, in spite of the great distance to the lubricant such as lubricating oil, for example, mainly accumulating at the bottom in the gear unit. Alternatively, the temperature sensor is in the form of a long bar, and therefore reaches from cover 2 mounted at the top to the oil pan lying at the bottom in the gear unit. In the last-mentioned case, the temperature is also ascertainable in cost-effective manner by determining the ohmic resistance of a sensor material, this sensor material being brought into thermal contact with the lubricant of the gear unit.

Sensor unit 6, which accommodates the sensors and to which evaluation unit 1 is connected, permits rapid and easy production, especially a rapid and easy connection of the sensors to cover 2. In this context, cover 2 is produced, for instance, from die-cast aluminum or cast steel, and the sensor unit is produced from plastic, for example.

Further sensors may be provided on the sensor unit.

For example, a torque sensor may be provided, which detects the torsion with the aid of a strain-sensitive element such as a strain gauge DMS or OFW sensor applied on a shaft or on a toothing part. The non-contact sensing by the torque sensor makes it possible to place the torque sensor on the rotating part. When working with a DMS, an inductive coupling is advantageous for the non-contact transmission of the sensor signals, the signals of the sensor being conducted onto the primary winding, and the voltage occurring at the secondary winding, provided in stationary manner on cover 2 or the gear housing, being fed to the evaluation unit. For the non-contact transmission of the sensor signals in the case of OFW, an antenna is provided on the cover for transmitting the interrogation pulses and receiving the response signals. Thus, even a plurality of OFW sensors may be provided in the interior of the gear unit, whose signals are uniquely assignable by identification information.

The torque sensors permit a process control, a monitoring for the exceeding of the maximum permissible torque, and other condition-monitoring of the gear unit, particularly by the evaluation unit.

Instead of the OFW or DMS sensors, suitable magnetizations may also be provided on the toothing part or on a shaft of the gear unit, which are detectable by sensors sensitive to magnetic fields, and in this manner, the torque is determinable.

In addition, an oil-condition sensor may be provided as sensor, from whose signals the evaluation unit determines an oil-change indicator value, thus, the display of the evaluation unit displays information about an oil change becoming necessary for the gear unit.

A sensor for detecting the oil level may be provided as a further sensor.

Moreover, a sensor may also be provided which detects a displacement of a component of the gear unit, e.g., a shaft or a toothing part. For example, an inductive distance sensor is useable for this purpose, which monitors the shaft orbit, thus the volume taken up by the material of the shaft. If this distance sensor determines a fluctuation in the distance of the shaft, this indicates wear of the bearings. In particular, an error-proof detection of the wear to the bearings is achieved if the time characteristic of the fluctuation correlates with the rotational speed of the shaft. In this context, the correlation is determined by the evaluation unit which is also supplied with information about the rotational speed, e.g., with the aid of an inductive sensor that is directed at the teeth of a toothing part. In a further refinement, it is even made possible to infer the bearing wear from only the sensor signal of this last-named sensor, by monitoring this signal for a correlation of two frequency components which differ from each other only by a whole-number factor that corresponds to the number of teeth in the gear wheel.

The evaluation unit also includes a timing element such as a quartz oscillating circuit and/or integrated clock, with whose time information the above-indicated determinations are accomplished.

In a further refinement, the evaluation unit is supplied from energy dissipated from the gear unit, for example, by a Peltier element through which the heat to be dissipated to the surroundings is conducted. Alternatively, the supply is achieved from a generator integrated into the gear unit, e.g., by providing a magnet or a magnetization on the rotating parts, and providing around this magnetized region a coil winding, from which the evaluation unit is able to be supplied.

In a further development, the evaluation unit includes an input device by which parameters are able to be input. The evaluation unit includes interfaces, as well. Moreover, the evaluation unit is able to be mounted on a housing part of the gear unit.

In another exemplary embodiment of the present invention, the sensor unit is formed in one piece with cover 2.

In a further exemplary embodiment according to the present invention, evaluation unit 1 is formed in one piece with sensor unit 6 and/or with cover 2.

In another exemplary embodiment of the present invention, OFW sensors are also used to sense temperature and to detect other physical quantities of the gear unit. In this context, the response signal of each sensor is uniquely assignable with the aid of identification information. Thus, in this exemplary embodiment, only one cutout needs to be provided in cover 2 for the inlet of the antenna.

What is claimed is:

1. A system, comprising:
a gear housing including a first cutout through which a gear is capable of being inserted into the housing;
at least one housing cover that covers the first cutout when installed on the gear housing and includes a second cutout; and
a sensor unit accommodated in the housing cover through the second cutout, the sensor unit including at least one sensor and at least one other sensor, wherein the at least one sensor is exposed to the gear in an interior of the gear housing via a passage extending between the first and second cutouts;
wherein the at least one other sensor includes at least one of (a) a vibration sensor and (b) a vibration sensor adapted to detect structure-borne noise generated by at least one of (i) bearings and (ii) toothing parts; and
wherein the housing cover includes a surface, the vibration sensor contacting the surface.

2. The system according to claim 1, wherein the sensor unit includes accommodations for the at least one sensor and the at least one other sensor.

3. The system according to claim 1, wherein the sensor unit is joined to the housing cover on a side of the housing cover facing surroundings.

4. The system according to claim 1, wherein the sensor unit is formed in one piece with the housing cover.

5. The system according to claim 1, wherein the housing cover is made of metal.

6. The system according to claim 5, wherein the sensor unit is made of at least one of (a) a metal different than the metal of the housing cover and (b) plastic.

7. The system according to claim 1, wherein the sensor unit is made of a metal for shielding.

8. The system according to claim 1, wherein the at least one sensor includes at least one of (a) an inductive proximity sensor and (b) an inductive proximity sensor adapted to determine rotation of a toothing part.

9. The system according to claim 1, wherein the at least one sensor includes at least one of (a) an oil-condition sensor and (b) an infrared oil-condition sensor adapted to determine at least one of (a) a condition and (b) an age of lubricating oil of the gear housing.

10. The system according to claim 1, wherein the at least one sensor includes at least one of (a) a torque sensor, (b) an OFW torque sensor, (c) a DMS torque sensor, and (d) a sensor adapted to determine torque transmitted with the aid of a shaft of the gear housing.

11. The system according to claim 1, wherein the at least one sensor includes an oil-level sensor.

12. The system according to claim 1, wherein at least one of the at least one sensor is adapted to determine a displacement of a component of the gear housing.

13. The system according to claim 1, further comprising an evaluation unit, the sensors of the sensor unit connected at least electrically to the evaluation unit.

14. The system according to claim 13, wherein the evaluation unit is at least one of (a) connected to the sensor unit, (b) connected to the sensor unit on a side of the sensor unit facing surroundings, and (c) formed in one piece with the sensor unit.

15. The system according to claim 13, wherein the evaluation unit includes at least one of (a) a timing element and (b) a quartz-crystal oscillator.

16. The system according to claim 13, wherein the evaluation unit at least one of (a) includes a display device, (b) includes at least one interface, and (c) is arranged as a node of a bus system.

* * * * *